United States Patent [19]

Gallois

[11] 4,038,558
[45] July 26, 1977

[54] ELECTRIC POWER GENERATING DEVICE FED WITH ENERGY RECOVERED FROM THE EXHAUST GASES OF AN INTERNAL COMBUSTION ENGINE

[75] Inventor: Jacques Gallois, Paris, France

[73] Assignee: Societe d'Etudes de Machines Thermiques, Saint Denis, France

[21] Appl. No.: 621,501

[22] Filed: Oct. 10, 1975

[30] Foreign Application Priority Data

Dec. 23, 1974 France .................................. 74.42533

[51] Int. Cl.² .............................................. F02G 3/02
[52] U.S. Cl. .................................. 290/52; 60/624; 60/618
[58] Field of Search ....................................... 318/9–15; 60/624, 618

[56] References Cited

U.S. PATENT DOCUMENTS

| 1,339,177 | 5/1920 | Dyer | 60/618 |
| 2,795,748 | 6/1957 | Wellington et al. | 318/13 |
| 3,541,783 | 11/1970 | Schmuck | 60/618 |

Primary Examiner—Robert K. Schaefer
Assistant Examiner—John W. Redman
Attorney, Agent, or Firm—Jay L. Chaskin

[57] ABSTRACT

An electric power generating device recovering the energy of the exhaust gases of an internal combustion engine, comprising a speed-reducer mounted between the engine and a transmission shaft and a turbo-alternator set driven by the energy taken from said exhaust gases and the turbine of which is operatively connected to said reducer through a reversible transmission system with variable speed keyed in follow-up relationship to the speed variations of said transmission shaft.

5 Claims, 1 Drawing Figure

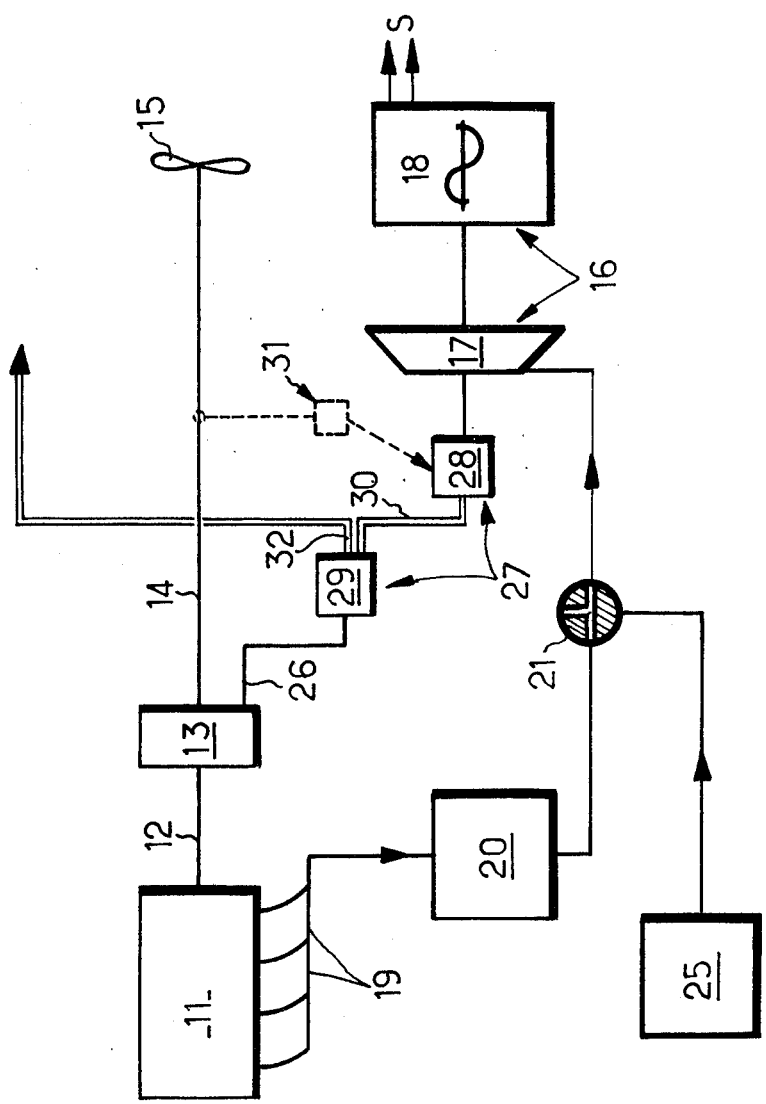

ELECTRIC POWER GENERATING DEVICE FED WITH ENERGY RECOVERED FROM THE EXHAUST GASES OF AN INTERNAL COMBUSTION ENGINE

The present invention relates essentially to an electric generating device using a turbo-alternator set fed with energy originating from the exhaust gases of an internal combustion engine or the like. In particular but not exclusively a device according to the invention may be used for fitting out some ships the electric power of which required for the operation of ship-borne equipment or like on-board fittings is supplied by the energy taken from the exhaust gases of a Diesel engine which drives the propeller screw.

On some ships or vessels indeed the on-board generated electricity is produced by a turbo-alternator set the turbine of which is driven by the exhaust gases of an internal combustion engine driving a propeller screw of the ship through the agency of a suitable mechanical speed-reducer. As the recovered energy is mostly higher than the electricity requirements of the ship the excess power is mechanically conveyed back to the speed-reducer in order to be transmitted to the propeller screw. Such a coupling between the turbine and the speed-reducer would involve that the engine is working or running at a steady speed since the turbo-alternator set should itself be driven at constant speed to supply a stable output voltage. Under such circumstances it is necessary to fit the ship with a variable-pitch screw propeller so as to be able to control or adjust the speed thereof.

In addition to the well-known relative fragility of this kind of screw propeller it may happen under some navigational conditions in particular at heavy swell or surge of the sea or stormy weather that the screw propeller is more or less moving out or emerging from the water at some times thereby resulting in sudden decreases in the load torque applied to the transmission shaft and accordingly to the output of the engine. Such torque variations will result in speed variations of the transmission shaft which are too sudden and/or too large to be properly compensated for through a re-adjustment of the pitch of the screw propeller. Such variations will of course be reflected back through the speed-reducer onto the turbine the rotary or running speed stability of which is thus seriously affected thereby resulting in variations in the output voltage of the alternator which may be dangerous for the electrical fittings on board. This problem has been solved heretobefore by inserting a releasable or disengageable clutch into the mechanical transmission or gearing system between the turbine and speed-reducer for disconnecting or throwing said transmission out of gear. Thus as soon as sharp variations in speed are detected or sensed on the transmission shaft owing to bad navigational conditions the releasable clutch is actuated to be disengaged and the operation of the turbine is no longer disturbed or interferred with by the speed-reducer thereby enabling to retain a nearly stable electric voltage for feeding the fittings on board even under difficult sailing conditions.

The present invention aims at improving the working of this kind of device and overcoming the inconveniences stated hereinabove. In particular one of the objects of the invention is to remove the need for using a controllable-pitch screw propeller. According to another aspect of the invention the releasable clutch is also dispensed with and the velocity of the turbo-alternator set may be kept constant irrespective or that of the speed-reducer to which the turbine of the turbo-alternator set delivers as previously a certain amount of excess power recovered from the exhaust gases of the engine.

Bearing this in mind the invention is more particularly directed to an electric power generating device fed by the energy recovered from the exhaust gases of an internal combustion engine and of the kind comprising a speed-reducer mounted between the engine and a transmission shaft and a turbo-alternator set driven by the power taken from said exhaust gases, the turbine of said turbo-alternator set being coupled to said speed-reducer, said device being characterized in that said turbine is operatively connected to said speed-reducer through the agency of a variable-speed reversible transmission arrangement or appliance preferably keyed or phase-locked in follow-up relationship to the actual speed variations of said transmission shaft.

Said transmission arrangement or apparatus consists of a hydrostatic transmission system.

Thus by substituting a simple hydrostatic transmission member or contrivance for the releasable clutch means several drawbacks inherent in the prior art devices (variable-pitch screw-propeller, difficulties of operation at hollow or heavy sea, ...) are removed at the same time and additional advantageous capabilities are available for running the ship as for instance the control or drive of auxiliary machinery or appliances through the agency of the hydraulic circuitry of the hydrostatic transmission system as will be described hereinafter.

The invention will be better understood and further objects, characterizing features, details and advantages thereof will appear more clearly as the following explanatory description proceeds with reference to the accompanying diagrammatic drawing given by way of non-limiting example only illustrating a specific presently preferred form of embodiment of the invention and wherein the single Figure shows a device according to the principles of the invention as applied to a ship propelled by a screw-propeller driven by a Diesel engine.

Referring to the drawing there is shown a Diesel engine 11 the crank-shaft 12 of which is operatively connected to a speed-reducing gear or the like 13 the output of which drives a transmission shaft 14 of a screw-propeller 15. The arrangement further comprises a turbo-alternator set 16 consisting of a turbine 17 and of an alternator 18. The latter is connected at its output S to the electric circuitry (not shown) feeding the fittings and apparatus provided on board of the vessel and including in particular navigational apparatus, lighting and signalling circuitry, etc. The input of the turbine 17 is connected to the output piping of a boiler 20 the heating piping of which is connected to the exhaust manifolds 19 of the engine 11. A change-over or switching member 21 such as a three-way valve is inserted into the circuitry between the boiler and the turbine 17. The other input of the change-over or switching member 21 is connected to the output of an auxiliary working fluid generator such as an independent or separate boiler 25 adapted to replace the boiler 20 in case of failure or breakdown of the boiler 20 or the engine 11 becoming damaged, injured or disabled. On the speed-reducing gear 13 is provided an auxiliary input 26 designed to be capable of normally conveying a given part of the energy recovered from the exhaust gases through the boiler 20 and the turbine 17 to the transmission shaft 14.

According to the invention the auxiliary input 26 is coupled to the turbine 17 through the agency of a hydrostatic transmission system 27 consisting essentially of a pump 28 with variable output, flow rate or capacity operatively connected to a hydraulic receiver or sink means 29 forming a power drive through the medium of the working fluid flow circuit 30.

Hydrostatic transmission systems are well known in the art. They are generally designed for conveying the power from a prime mover (the turbine 17 in the present instance) operating at substantially constant speed to a receiving or driven member the rotary speed or running velocity of which may vary to a large extent (speed-reducing gear 13). They generally consist of a volumetric or positive-displacement hydraulic pump with variable output or flow-rate capacity driven by the prime mover and connected through pipe-lines (circuit 30 in the present case) to a hydraulic motor also of volumetric or positive-displacement character operatively connected to the receiving or driven member. The output flow-rate delivered by the pump will determine the rotary speed of the motor. A widespread kind of hydrostatic transmission system is known under the name of "THOMAS" system. Such a system makes use of a rotary multi-cylinder pump with mechanically driven revolving plunger-carrying barrel, casing or like body, such as for instance a swash-plate pump or the like. The drive-shaft of the pump terminates in a crosswise arranged circular swash-plate to which are pivoted the connecting rods of the pistons or plungers which are reciprocating inside of the bores of the barrel forming the pump body or casing. Since the barrel makes an angle with the swash-plate reciprocatory motions of the plungers or pistons are achieved when said swash-plate is drivingly rotated or revolving. The output flow rate delivered by the pump is adjusted by varying the angle between the swash-plate and the barrel. The pump is connected to a hydraulic motor which forms the receiver or driven means. The latter is of a construction very similar to that of the pump but of a simpler design since as its cylinder cubic capacity is constant it does not include any mechanism for varying the angle between the barrel and the swash-plate.

A significant advantage of such a hydrostatic transmission system is its reversibility which results from the use of a pump and a receiver or driven means of like constructions.

In the example disclosed the output flow rate delivered by the pump 28 is controlled by a servo-control system 31 (diagrammatically shown in broken lines or dashes) sensitive to variations in speed of the shaft 14. Owing to such a servo-control system the screw-propeller 15 is no longer required to be of the variable-pitch type. Also an intermediate pressure fluid tapping or intake 32 is provided between the pump 28 and the motor 29. This tapping or intake is connected to an operative control or driving arrangement for auxiliary apparatus which may include one or several hydraulic motors for unloading goods and/or cargo-handling pumps.

The operation of the assembly is very simple and results directly from the detailed disclosure just made. When the engine 11 and the boiler 20 are working normally the valve 21 is in the position shown in the drawing. The turbine 17 of the turbo-alternator set is therefore normally driven or powered by the boiler 20 heated by the exhaust gases of the engine 11. The excess power is conveyed to the input 26 of the speed-reducing gear 13 through the agency of the hydrostatic transmission system 27. As however the running speed of the motor 29 depends upon the output flow rate or capacity of the pump 28 which is keyed or phase-locked in follow-up relationship to the rotary speed of the shaft 14 any disturbing interference or interaction is thus avoided between the speed-reducing gear 13 and the turbine 17. As previously mentioned, as the speed of rotation of the transmission shaft 14 may now vary within fairly wide limits it is no longer necessary to operate the engine 11 at constant speed of accordingly to use a variable-pitch screw-propeller.

When the engine 11 is stopped or at rest (in particular when the ship is berthed or brought alongside) it is possible by switching or changing over the valve 21 to use the auxiliary boiler 25 for producing electricity on board without using a separate electric power plant. Also in case of failure or breakdown of the Diesel engine only the power output of this auxiliary boiler 25 may be conveyed to the screw-propeller through the agency of the turbine 17, the hydrostatic transmission system 27 and the speed-reducing gear 13. This allows to perform a slow displacement of the ship thus imparting her some mobility which may be valuable under such circumstances.

This is not the only advantage which results from the use of the hydrostatic transmission system 27 since under other circumstances and in particular in case of injury or damage to the boiler 20 and/or the boiler 25 the ship may be fed with electricity by directly using a part of the power supplied by the engine 11 through the medium of the tapping or intake 32, since the transmission system 27 is reversible. Also in the harbor it is possible by unclutching the engine 11 from the transmission shaft to use the hydraulic motor 29 as a pump and thus to feed or energize the aforesaid control or drive of auxiliary equipment with the power delivered by the engine 11. This is of course possible only if the motor 29 has been previously properly sized or designed for this purpose.

The invention is of course not at all limited to the form of embodiment which has been described and which has been given by way of example only. It comprises all the technical equivalents of the means described and the combinations thereof if same are used within the gist of the invention and the scope of the appended claims.

What we claim is:

1. An electric power generating device operated by recovering the energy from the exhaust gases of an internal combustion engine, comprising speed-reducing means mounted between said engine and a transmission shaft and a turbo-alternator set driven by said energy taken from said exhaust gases, the turbine of said turbo-alternator set being operatively coupled to said speed-reducing means, wherein the improvement consists in that said turbine is operatively coupled to said speed-reducing means through the agency of a (variable-speed reversible transmission member) keyed in follow-up relationship to the actual speed variations of said transmission shaft.

2. A device according to claim 1, wherein said transmission member is a hydrostatic transmission system.

3. A device according to claim 2, further comprising an intermediate pressure fluid intake-like tapping provided between both stages of said transmission system and connected to a control arrangement driving auxiliary equipment.

4. A device according to claim 1, further comprising an auxiliary working fluid generator for feeding said turbine and change-over means for connecting the input of said turbine either to the exhaust of said engine or to the output of said generator.

5. A device according to claim 4, further comprising boiler means through which the input of said turbine is connectable through said change-over means to the exhaust of said engine.

* * * * *